US012808816B2

(12) United States Patent
Someya et al.

(10) Patent No.: US 12,808,816 B2
(45) Date of Patent: Nov. 24, 2026

(54) PARTICLE INSPECTION DEVICE AND PARTICLE INSPECTION METHOD

(71) Applicant: HORIBA, LTD., Kyoto (JP)

(72) Inventors: Shota Someya, Kyoto (JP); Toyoki Kanzaki, Kyoto (JP)

(73) Assignee: HORIBA, LTD., Kyoto (JP)

( * ) Notice: Subject to any disclaimer, the term of this patent is extended or adjusted under 35 U.S.C. 154(b) by 7 days.

(21) Appl. No.: 18/282,621

(22) PCT Filed: Feb. 7, 2022

(86) PCT No.: PCT/JP2022/004593
§ 371 (c)(1),
(2) Date: Sep. 18, 2023

(87) PCT Pub. No.: WO2022/201910
PCT Pub. Date: Sep. 29, 2022

(65) Prior Publication Data

US 2024/0159686 A1 May 16, 2024

(30) Foreign Application Priority Data

Mar. 22, 2021 (JP) ................................. 2021-047589

(51) Int. Cl.
*G01N 21/94* (2006.01)
*G01N 21/88* (2006.01)
*G01N 21/956* (2006.01)

(52) U.S. Cl.
CPC ......... *G01N 21/94* (2013.01); *G01N 21/8806* (2013.01); *G01N 21/956* (2013.01)

(58) Field of Classification Search
CPC ................... G01N 21/84; G01N 21/94; G01N 2015/0238; G01N 2021/95676;
(Continued)

(56) References Cited

U.S. PATENT DOCUMENTS 5,798,831 A * 8/1998 Hagiwara .............. G01N 21/94
356/237.2
6,366,690 B1 4/2002 Smilansky et al.
(Continued)

FOREIGN PATENT DOCUMENTS

CN 107086184 A 8/2017
CN 111727369 A 9/2020
(Continued)

OTHER PUBLICATIONS

International Search Report issued in International application No. PCT/JP2022/004593, dated Apr. 5, 2022.
(Continued)

*Primary Examiner* — Kara E. Geisel
*Assistant Examiner* — Christina I Xing
(74) *Attorney, Agent, or Firm* — Greenblum & Bernstein, P.L.C.

(57) ABSTRACT

The present invention reduces erroneous detection due to diffracted light from a pattern, and provides a particle inspection device that inspects a particle adhering to a substrate on which a pattern is formed, including: a light irradiation unit that linearly scans and irradiate the substrate with a laser beam; a first light detection unit and a second light detection unit that detect light reflected by the substrate; and a particle detection unit that detects the particle based on output signals of the first light detection unit and the second light detection unit, in which the first light detection unit and the second light detection unit are arranged such that a light reception elevation angle α with respect to a surface of the substrate and a light reception horizontal angle β with respect to a scanning direction of the laser beam are different from each other.

6 Claims, 6 Drawing Sheets

(58) Field of Classification Search
CPC ....... G01N 2021/8848; G01N 21/8806; G01N 21/956; G01N 21/4788; G01N 2021/4711; G03F 1/84; H01L 21/66
See application file for complete search history.

(56) References Cited

U.S. PATENT DOCUMENTS

| | | | | |
|---|---|---|---|---|
| 2002/0054704 | A1 | 5/2002 | Smilansky et al. | |
| 2002/0145732 | A1* | 10/2002 | Vaez-Iravani | G01N 21/956 356/237.2 |
| 2005/0018181 | A1* | 1/2005 | Vaez-Iravani | G01N 21/9501 356/237.4 |
| 2005/0129302 | A1* | 6/2005 | Smilansky | G01N 21/9501 382/149 |
| 2009/0290168 | A1 | 11/2009 | Hamamatsu et al. | |
| 2012/0162665 | A1 | 6/2012 | Hamamatsu et al. | |
| 2012/0293795 | A1* | 11/2012 | Urano | G01N 21/9501 356/237.5 |
| 2013/0107247 | A1* | 5/2013 | Hamamatsu | G01B 11/303 356/600 |
| 2020/0393388 | A1 | 12/2020 | Makuuchi et al. | |
| 2024/0133824 | A1* | 4/2024 | Urano | G01N 21/93 |

FOREIGN PATENT DOCUMENTS

| | | | |
|---|---|---|---|
| JP | 6-94633 | | 4/1994 |
| JP | 7-69272 | | 7/1995 |
| JP | 09-113459 | A | 5/1997 |
| JP | 2002-519694 | | 7/2002 |
| JP | 2009-162768 | A | 7/2009 |
| JP | 2010-2406 | | 1/2010 |
| JP | 2010-133864 | A | 6/2010 |
| TW | 200846651 | | 12/2008 |
| TW | 201610420 | A | 3/2016 |
| WO | 00/02037 | | 1/2000 |
| WO | 2011/105016 | | 9/2011 |

OTHER PUBLICATIONS

Taiwan, Office Action received in TW patent application No. 111109305, dated Jun. 20, 2025, and English language translation thereof.

Office Action dated Mar. 28, 2026 issued in CN patent application No. 202280022327.1.

Office Action dated Apr. 2, 2026 issued in JP patent application No. 2023-508748.

Office Action dated Apr. 9, 2026 issued in KR patent application No. 10-2023-7031084.

Office Action dated Aug. 27, 2026 issued in JP patent application No. 2023-508748.

* cited by examiner

PARTICLE INSPECTION DEVICE AND PARTICLE INSPECTION METHOD

TECHNICAL FIELD

The present invention relates to a particle inspection device and a particle inspection method for inspecting a particle adhering to a substrate on which a pattern is formed.

BACKGROUND ART

Conventionally, as shown in Patent Literature 1, a device for inspecting a particle on a substrate on which a pattern such as a reticle is formed has been contemplated. In order to distinguish between scattered light due to the particle and scattered light due to a pattern edge, this particle inspection device has been contemplated in which two photoelectric detectors are arranged at desired positions by focusing on the fact that scattered light due to foreign matte is non-directional and scattered light due to a pattern edge has directivity.

Incidentally, a pattern formed on a substrate such as a reticle in recent years has become complicated and dense, and in a case of inspecting a particle on the substrate on which this pattern is formed, in addition to scattered light by a pattern edge, erroneous detection by diffracted light from a line-and-space becomes a problem.

However, in the particle inspection device disclosed in Patent Literature 1, the diffracted light from the line-and-space of the pattern formed on the substrate is not considered at all, and erroneous detection due to the diffracted light cannot be reduced.

CITATION LIST

Patent Literature

Patent Literature 1: JP H7-69272 B

SUMMARY OF INVENTION

Technical Problem

Therefore, the present invention has been made to solve the above problems, and a main object thereof is to reduce erroneous detection due to diffracted light from a pattern forming a specific angle (for example, from 20 to 40 degrees) with a scanning direction of a laser beam.

Solution to Problem

That is, a particle inspection device of the present invention inspects a particle adhering to a substrate on which a pattern is formed, and includes: a light irradiation unit that linearly scans and irradiate the substrate with a laser beam; a first light detection unit and a second light detection unit that detect light reflected by the substrate; and a particle detection unit that detects the particle based on output signals of the first light detection unit and the second light detection unit, in: which the first light detection unit and the second light detection unit are arranged such that a light reception elevation angle with respect to a surface of the substrate and a light reception horizontal angle with respect to a scanning direction of the laser beam are different from each other; the first light detection unit detects diffracted light from the pattern of which an angle with the scanning direction is a predetermined angle; and the second light detection unit detects diffracted light from the pattern of which an angle with the scanning direction is other than the predetermined angle.

In the particle inspection device, the first light detection unit and the second light detection unit are arranged such that the light reception elevation angle and the light reception horizontal angle are different from each other, the first light detection unit detects diffracted light from a pattern of which an angle formed with the scanning direction is a predetermined angle, and the second light detection unit detects diffracted light from a pattern other than the predetermined angle, whereby it is possible to determine whether the light is scattered light from the particle or scattered light from a pattern based on an output signal of the first light detection unit and an output signal of the second light detection unit. As a result, erroneous detection due to diffracted light from a pattern forming a specific angle (for example, from 20 to 40 degrees) with the scanning direction of the laser beam can be reduced.

Here, the first light detection unit detects scattered light from the particle and diffracted light from a pattern of which an angle with the scanning direction is a predetermined angle. On the other hand, the second light detection unit detects scattered light from the particle and diffracted light from a pattern of which an angle with the scanning direction is other than the predetermined angle. Therefore, when the output signal of the first light detection unit is greater than or equal to the predetermined threshold value and the output signal of the second light detection unit is greater than or equal to the predetermined threshold value, it can be determined that the first light detection unit and the second light detection unit have detected scattered light from the particle.

Therefore, the particle detection unit preferably determines that an object is the particle only when each of the output signals of the first light detection unit and the second light detection unit is greater than or equal to a predetermined detection threshold.

In addition, in order to make the cause known even when it is not determined as the particle, the particle detection unit preferably determines that the light is diffracted light from the pattern in a case where any of the output signals of the first light detection unit and the second light detection unit is less than the predetermined detection threshold.

In order to further improve the detection accuracy of the particle, a polarizing plate is preferably provided in front of each of the first light detection unit and the second light detection unit.

Here, by using the polarizing plate, it is possible to distinguish whether the light is scattered light from the particle or scattered light from the pattern. Incidentally, in the case of the monocular configuration (one light detection unit), if the scattered light from the particle and the scattered light from the pattern overlap even if the polarizing plate is used, it is not possible to distinguish between them. On the other hand, in the present invention, in the configuration of the compound eye configuration (two light detection units) in which the polarizing plate is used, even if the scattered light from the particle and the scattered light from the pattern overlap in one light detection unit, it is possible to distinguish whether the scattered light is the scattered light from the particle or the scattered light from the pattern in the other light detection unit, and by using the polarizing plate in the compound eye configuration, both effects can be more remarkable.

It is preferred that each of the first light detection unit and the second light detection unit includes a plurality of light detectors paired with each other, and each of the plurality of light detectors paired with each other detects light from different positions in the laser beam that scans linearly.

A particle inspection method of the present invention inspects a particle adhering to a substrate on which a pattern is formed, and includes: linearly scanning and irradiating the substrate with a laser beam and detecting light reflected by the substrate by a first light detection unit and a second light detection unit to detect the particle based on output signals of the first light detection unit and the second light detection unit, in which: the first light detection unit and the second light detection unit are arranged such that a light reception elevation angle with respect to a surface of the substrate and a light reception horizontal angle with respect to a scanning direction of the laser beam are different from each other; diffracted light from the pattern of which an angle with the scanning direction is a predetermined angle is detected by the first light detection unit; and diffracted light from the pattern of which an angle with the scanning direction is other than the predetermined angle is detected by the second light detection unit.

Furthermore, in order to implement the particle inspection method of the present invention, the particle inspection device described above can be used.

Advantageous Effects of Invention

According to the present invention described above, it is possible to reduce erroneous detection due to diffracted light from the pattern forming the specific angle (for example, from 20 to 40 degrees) with a scanning direction of the laser beam, and to improve detection accuracy of the particle.

DESCRIPTION OF EMBODIMENTS

Hereinafter, a particle inspection device and a particle inspection method according to an embodiment of the present invention will be described with reference to the drawings.

<Particle Inspection Device>

Figure 1:
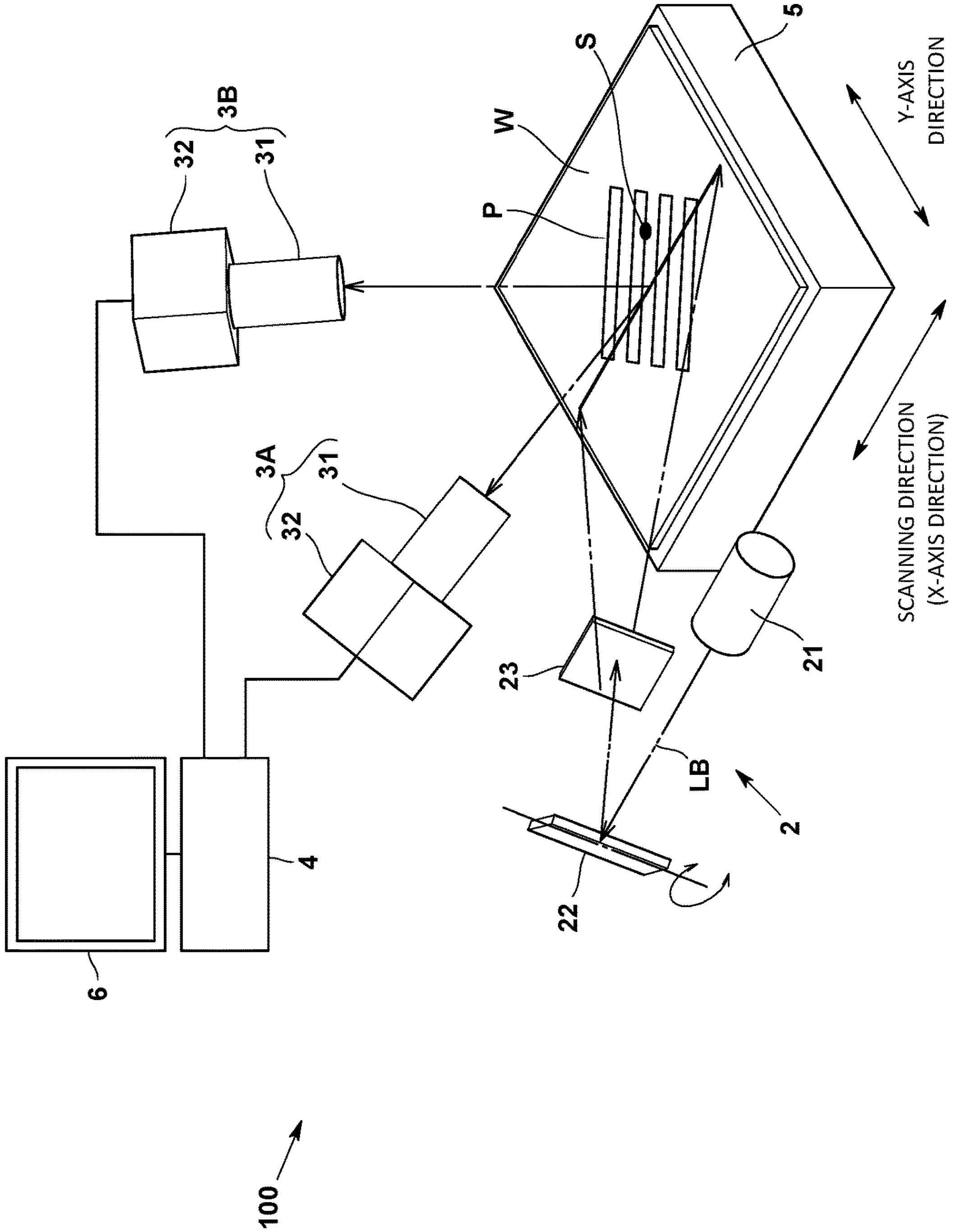
FIG. 1 is an overall schematic view of a particle inspection device according to an embodiment of the present invention.

The particle inspection device 100 of the present embodiment inspects a particle on a substrate W on which a pattern such as a reticle is formed, and includes, as illustrated in FIG. 1, a light irradiation unit 2 that linearly scans and irradiates the substrate W with a laser beam LB, a first light detection unit 3A and a second light detection unit 3B that detect light reflected by the substrate W, and a particle detection unit 4 that detects the particle based on output signals of the first light detection unit 3A and the second light detection unit 3B. The particle inspection device 100 further includes a moving stage 5 that moves the substrate W to be inspected in a predetermined direction (here, a Y-axis direction).

The light irradiation unit 2 irradiates the substrate W placed or held on the moving stage 5 with the laser beam LB while scanning the substrate W, and includes a laser beam source 21 that emits the laser beam LB, a scanning mirror 22 such as, for example, a galvano mirror that scans with the laser beam LB in a predetermined direction (here, an X-axis direction), and a scanning lens 23 such as, for example, an fθ lens. The light irradiation unit 2 is configured to irradiate the laser beam LB from the laser beam source 21 obliquely above the substrate W by a predetermined angle (from 10 to 80 degrees with respect to the surface of the substrate W, and 30 degrees with respect to the surface of the substrate W in the present embodiment) while linearly reciprocatingly scanning in the X direction. In the present embodiment, a laser tube such as a HeNe laser tube is used as the laser beam source 21.

The first light detection unit 3A and the second light detection unit 3B detect reflected and scattered light from the surface of the substrate W, are arranged obliquely above the substrate surface by a holding member (not illustrated), and each include a condenser lens, a fixed slit plate (not illustrated) having an incident light limiting slit for the reflected and scattered light, a light detector 31 (for example, a photomultiplier tube), and the like. In addition, the first light detection unit 3A and the second light detection unit 3B include a signal processor 32 that processes a light intensity signal of the light detector 31.

Specifically, the first light detection unit 3A and the second light detection unit 3B are arranged such that a light reception elevation angle α with respect to the surface of the substrate W and a light reception horizontal angle β with respect to the scanning direction of the laser beam LB are different from each other. Hereinafter, the light reception elevation angle of the first light detection unit 3A is referred to as al, the light reception horizontal angle is referred to as β1, the light reception elevation angle of the second light detection unit 3B is referred to as α2, and the light reception horizontal angle is referred to as β2 as appropriate.

Here, the light reception elevation angle α is an angle formed by a line L1 connecting the center of the light receiving surface of the light detector 31 and the scanning center of the laser beam LB on the surface of the substrate W and the substrate surface. The light reception horizontal angle β is an angle formed by a line L2 and the scanning direction (X-axis direction) when the line L1 is projected on the surface of the substrate.

Figure 2:
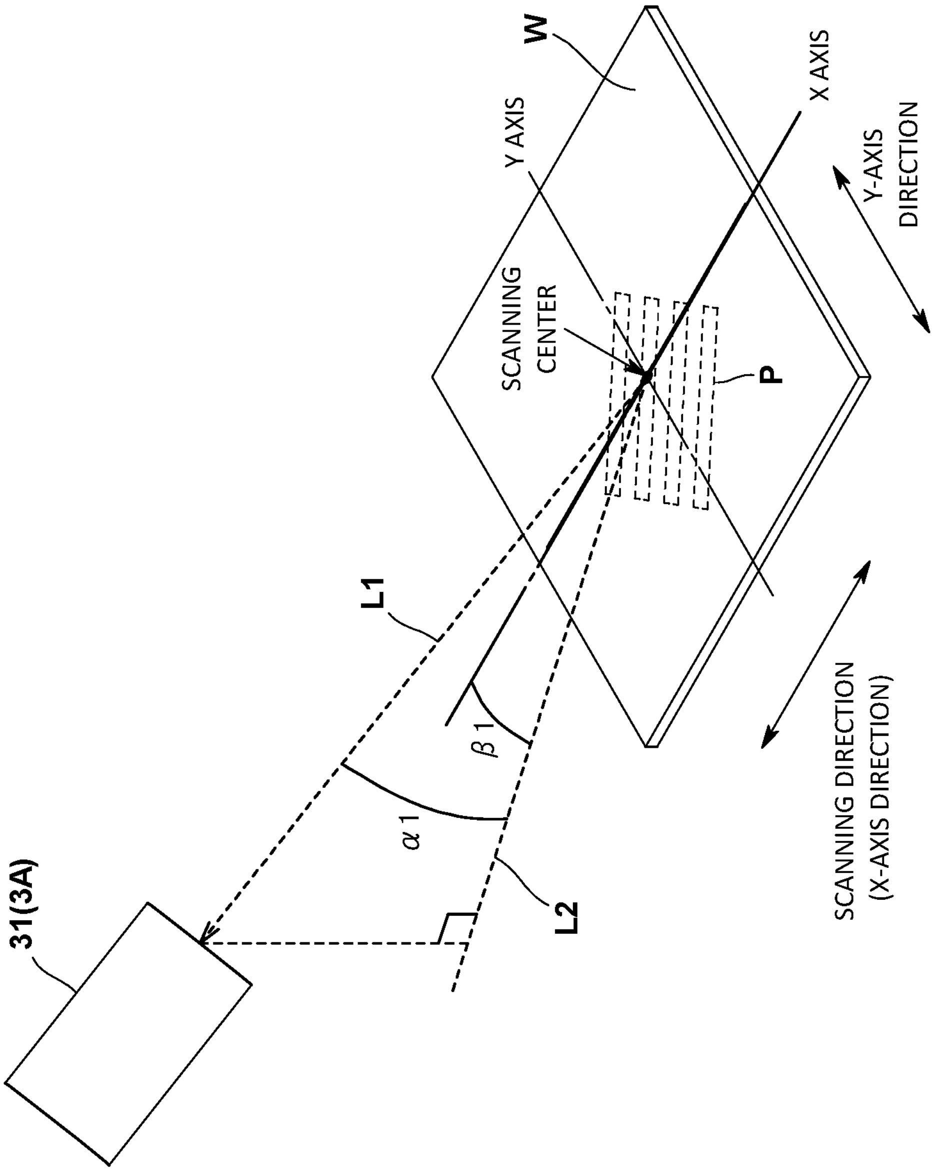
FIG. 2 is a schematic view illustrating an optical arrangement of a first light detection unit according to the embodiment.
Figure 3:
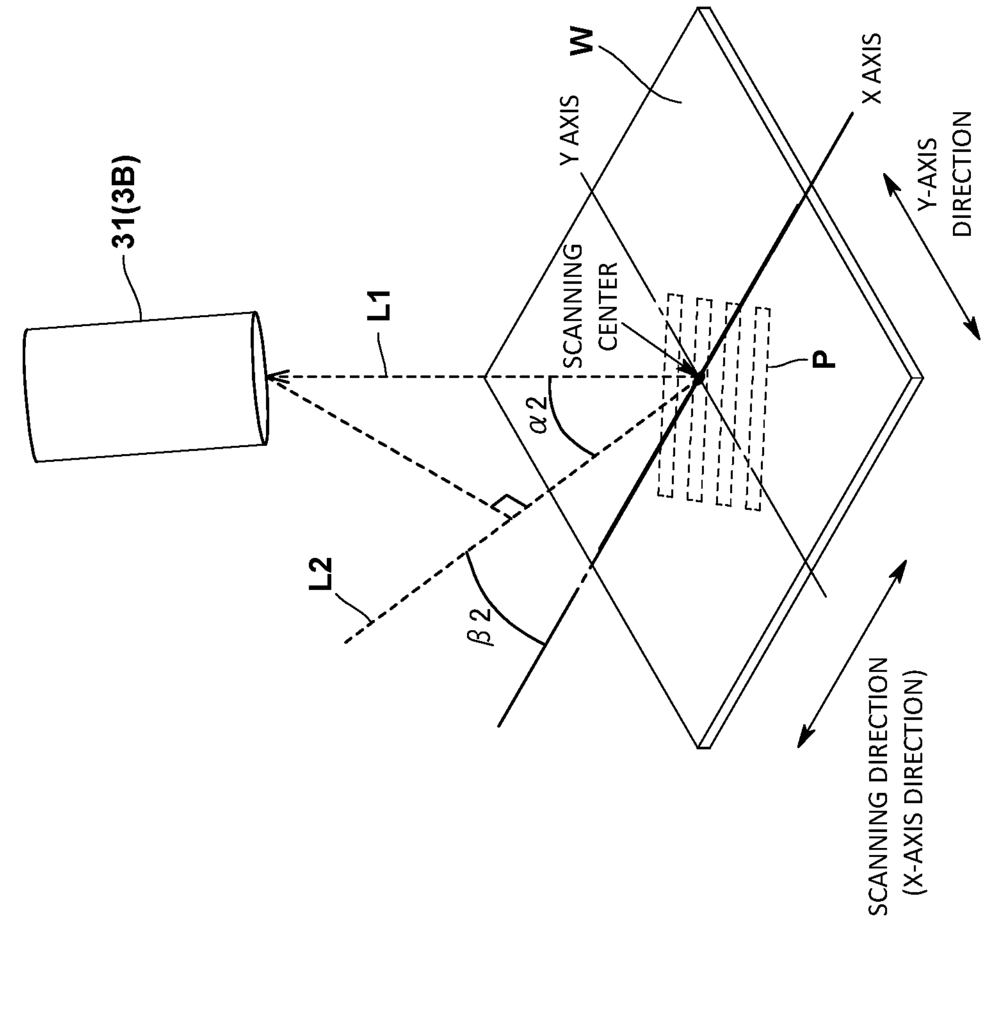
FIG. 3 is a schematic view illustrating an optical arrangement of a second light detection unit according to the embodiment.
Figure 4:
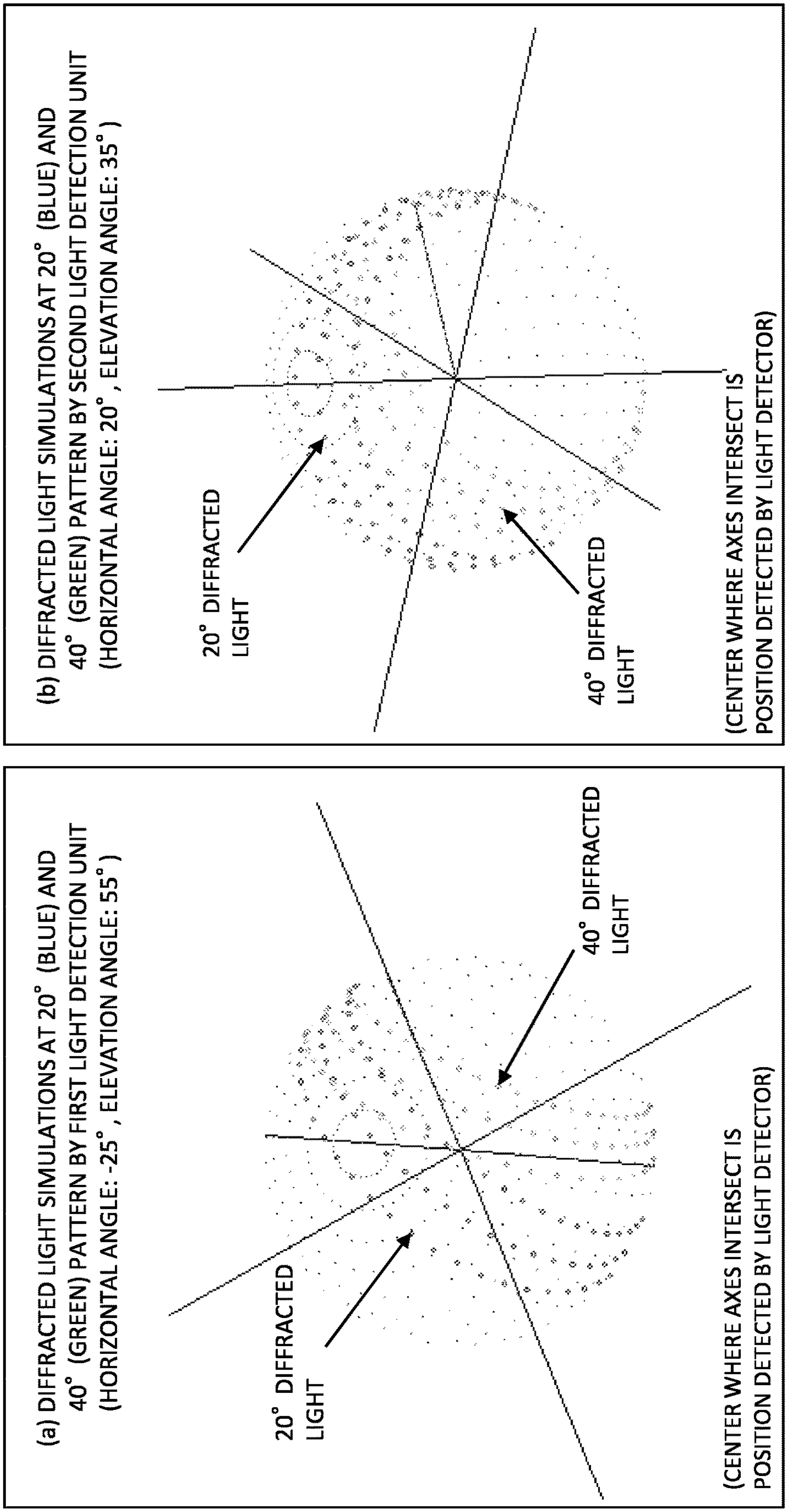
FIG. 4 is a simulation result of diffracted light detected by each light detection unit of the embodiment.

As illustrated in FIG. 2, the first light detection unit 3A of the present embodiment is arranged to detect diffracted light (hereinafter also referred to as 20° diffracted light or the like) from a pattern of which an angle formed with the scanning direction (X-axis direction) is a predetermined angle (from 20 to 40 degrees). Specifically, in the first light detection unit 3A, the light reception elevation angle α1 is 55 degrees, and the light reception horizontal angle β1 is −25 degrees. FIG. 4(*a*) illustrates diffracted light simulations at 20° and 40° received by the first light detection unit 3A with such an arrangement. In FIG. 2, the center where the axes intersect is the position detected by the light detector 31. At this time, it can be seen that the 20° diffracted light and the 40° diffracted light greatly overlap with the position to be detected, and the first light detection unit 3A detects the 20-40° diffracted light.

In addition, the second light detection unit 3B is arranged to detect diffracted light from a pattern of which an angle formed by the second light detection unit 3B and the scanning direction (X-axis direction) is other than a predetermined angle (other than from 20 to 40 degrees, for example, from 50 to 60 degrees). That is, the second light detection unit 3B is arranged at a position where the second light detection unit 3B does not receive the diffracted light of which an angle formed with the scanning direction (X-axis direction) is a predetermined angle (from 20 to 40°), or at a position where the second light detection unit 3B receives the diffracted light but the amount of light is less than a predetermined detection threshold to be described later. Specifically, in the second light detection unit 3B, the light reception elevation angle $\alpha$2 is 35 degrees, and the light reception horizontal angle $\beta$2 is 20 degrees. FIG. 4(*b*) illustrates diffracted light simulations at 20° and 40° received by the second light detection unit 3B with such an arrangement. At this time, the 20° diffracted light and the 40° diffracted light do not overlap the position detected by the second light detection unit 3B, and the second light detection unit 3B does not detect the 20-40° diffracted light.

The light reception elevation angles $\alpha$1 and $\alpha$2 and the light reception horizontal angles $\beta$1 and $\beta$2 of the first light detection unit 3A and the second light detection unit 3B are obtained from an incident angle of the laser beam LB on the substrate W, a swing angle of the laser beam LB, an angle formed with a scanning direction (X-axis direction) of the pattern, an angle formed with a normal line at an arbitrary point of an edge portion of the pattern and the substrate surface, and the like.

The particle detection unit 4 detects a particle based on output signals of the first light detection unit 3A and the second light detection unit 3B. Specifically, the particle detection unit 4 determines the particle only when each of the output signals of the first light detection unit 3A and the second light detection unit 3B is greater than or equal to a predetermined detection threshold. On the other hand, when any of the output signals of the first light detection unit 3A and the second light detection unit 3B is less than the predetermined detection threshold, the particle detection unit 4 determines that the light is diffracted light from the pattern.

Specifically, the predetermined detection threshold is set to a value that can be determined when each light detection unit detects scattered light from the particle, when the first light detection unit 3A detects the 20-40° diffracted light, and when the second light detection unit 3B detects diffracted light other than 20-40°. Note that the predetermined detection threshold may be the same or different between the first light detection unit 3A and the second light detection unit 3B.

(1) Case of Determining as the Particle

Output signal of first light detection unit 3A≥predetermined detection threshold, and output signal of second light detection unit 3B≥predetermined detection threshold (2) Case of Determining not the Particle but Pattern of 20-40°

Output signal of first light detection unit 3A≥predetermined detection threshold, and output signal of second light detection unit 3B<predetermined detection threshold (3) Case of Determining not the Particle but Pattern of Angle Other than 20-40°

Output signal of first light detection unit 3A<predetermined detection threshold, and output signal of second light detection unit 3B≥predetermined detection threshold The detection image (surface image of the substrate) obtained from the output signal of the first light detection unit 3A, the detection image (surface image of the substrate) obtained from the output signal of the second light detection unit 3B, and particle information (for example, position information and size information of the particle) obtained therefrom can be displayed on a display 6 of the particle inspection device or of the external device.

Effects of Present Embodiment

In the particle inspection device 100 according to the present embodiment thus configured, the first light detection unit 3A and the second light detection unit 3B are arranged such that the light reception elevation angle and the light reception horizontal angle are different from each other, the first light detection unit 3A detects diffracted light from a pattern of which an angle formed with the scanning direction is a predetermined angle, and the second light detection unit 3B detects diffracted light from a pattern other than the predetermined angle, whereby it is possible to determine whether the light is scattered light from the particle or scattered light from a pattern based on an output signal of the first light detection unit 3A and an output signal of the second light detection unit 3B. As a result, erroneous detection due to diffracted light from a pattern forming a specific angle (for example, from 20 to 40 degrees) with the scanning direction of the laser beam LB can be reduced.

Other Modified Embodiments

Note that the present invention is not limited to the above embodiments.

Figure 5:
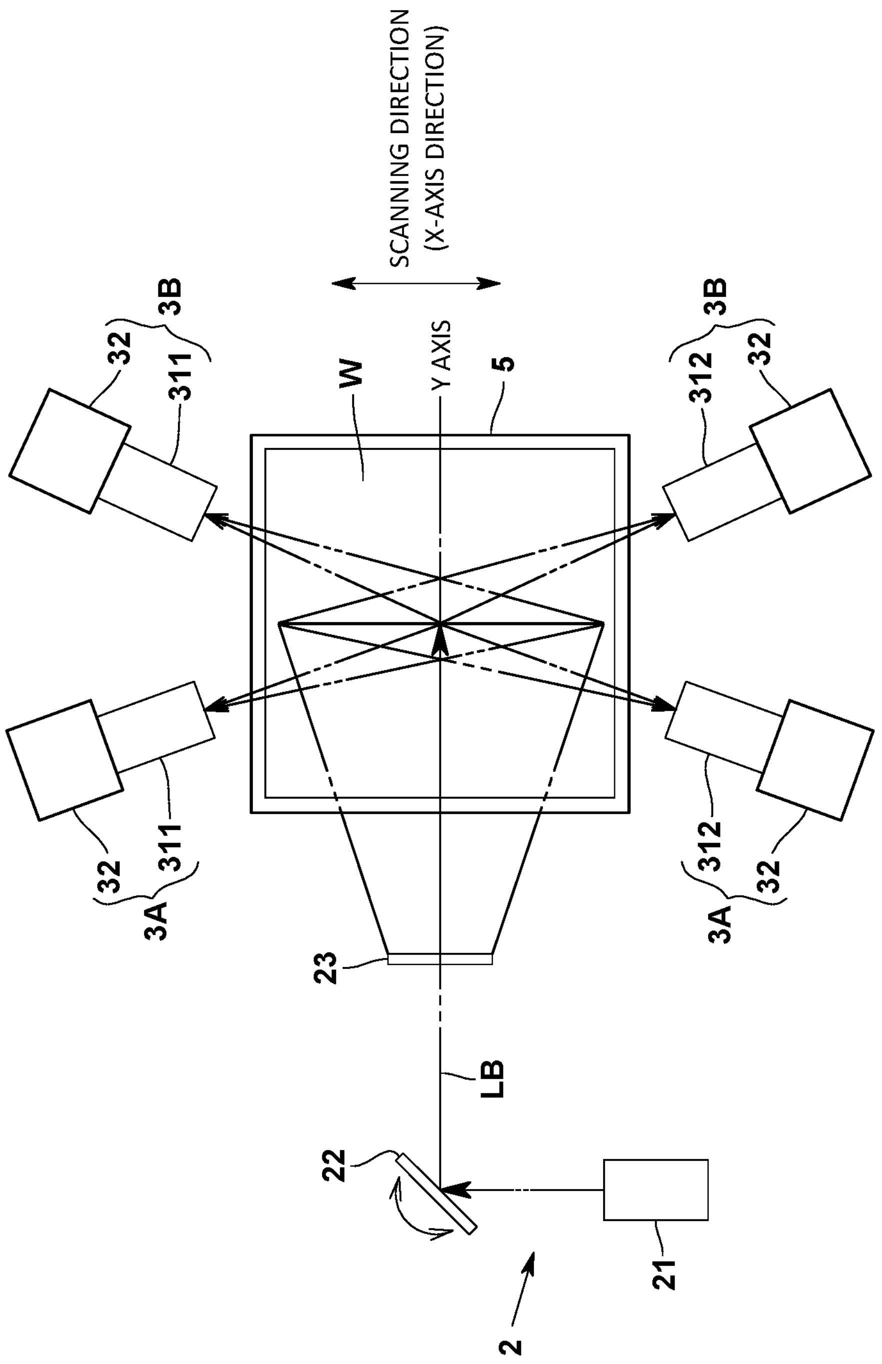
FIG. 5 is a diagram schematically illustrating a configuration of a light detection unit according to a modified embodiment.

For example, as illustrated in FIG. 5, each of the first light detection unit 3A and the second light detection unit 3B may include a plurality of (two in this case) light detectors 311 and 312 paired with each other. Here, the two light detectors 311 and 312 of the first light detection unit 3A are arranged so as to detect diffracted light from the pattern of which an angle formed with the scanning direction (X-axis direction) is a predetermined angle (from 20 to 40 degrees), similarly to the above-described embodiment. In addition, similarly to the above embodiment, the two light detectors 311 and 312 of the second light detection unit 3B are arranged to detect diffracted light from a pattern of which an angle formed with the scanning direction (X-axis direction) is other than the predetermined angle (other than from 20 to 40 degrees, for example, from 50 to 60 degrees). Here, the two detectors 311 and 312 of each of the light detection units 3A and 3B are arranged symmetrically with respect to the Y-axis direction (direction orthogonal to the scanning direction).

Then, each of the two light detectors paired with each other detects light from different positions in the laser beam LB scanning linearly. Specifically, one light detector 311 detects light from one side (one half in the X-axis direction) from the scanning center, and the other light detector 312 detects light from the other side (the other half in the X-axis direction) from the scanning center. With this configuration, the particle can be accurately detected. Note that the detection regions of the two light detectors 311 and 312 may partially overlap.

Figure 6:
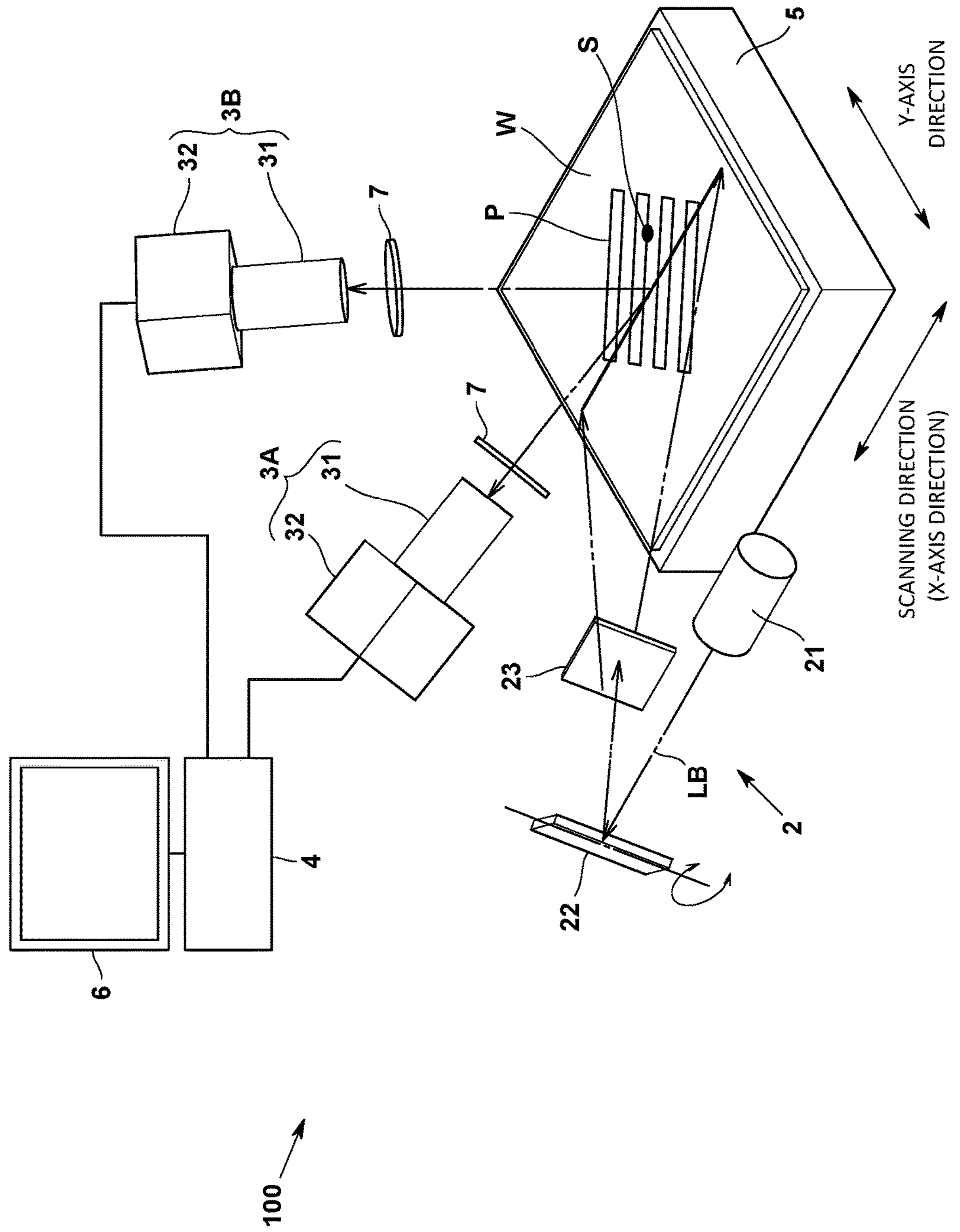
FIG. 6 is an overall schematic view of a particle inspection device according to the modified embodiment.

Further, in addition to the configuration of the above embodiment, as illustrated in FIG. 6, a polarizing plate 7 may be provided in front of each of the first light detection unit 3A and the second light detection unit 3B. Here, the rotation angle (polarization direction) of the polarizing plate 7 is set such that the difference between the scattered light intensity from the particle and the scattered light intensity from the pattern is maximized. As a result, it is possible to discriminate strong diffracted light (light having an intensity that cannot be dropped by the polarizing plate) from the pattern by the compound-eye configuration using the first light detection unit 3A and the second light detection unit 3B, and it is possible to block ambient light by the polarizing plate 7.

In the above embodiment, focusing on the 20-40° diffracted light, erroneous detection due to the 20-40° diffracted light is reduced; however, erroneous detection due to diffracted light from a pattern of other angles (the predetermined angle is other than from 20 to 40 degrees) may also be reduced.

In addition, various modifications and combinations of the embodiments may be made without departing from the gist of the present invention.

INDUSTRIAL APPLICABILITY

According to the present invention, erroneous detection due to diffracted light from a pattern forming a specific angle (for example, from 20 to 40 degrees) with the scanning direction of the laser beam can be reduced.

REFERENCE SIGNS LIST

100 particle inspection device
P pattern
W substrate
S particle
LB laser beam
2 light irradiation unit
3A first light detection unit
3B second light detection unit
311, 312 paired light detectors
4 particle detection unit
α light reception elevation angle
β light reception horizontal angle
6 polarizing plate

The invention claimed is:

1. A particle inspection device that inspects a particle adhering to a substrate that comprises a reticle on which a pattern is formed, the particle inspection device comprising:

a light irradiation unit that linearly and reciprocally scans the substrate with a laser beam at a predetermined scanning direction, and the light irradiation unit obliquely irradiates the substrate at a first predetermined angle with respect to a surface of the substrate;

a first light detection unit and a second light detection unit that detect light reflected by the substrate; and a particle detection unit that detects the particle based on output signals of the first light detection unit and the second light detection unit, wherein the first light detection unit and the second light detection unit are arranged obliquely at different elevation angles above the surface of the substrate, such that a light reception elevation angle with respect to the surface of the substrate and a light reception horizontal angle with respect to the predetermined scanning direction of the laser beam are different from each other, and such that an optical axis of the light irradiation unit is different from each from among a first reception axis of the first light detection unit and a second reception axis of the second light detection unit, the first light detection unit detects diffracted light from the pattern of which an angle with the predetermined scanning direction is a second predetermined angle, and the second light detection unit detects diffracted light from the pattern of which an angle with the predetermined scanning direction is other than the second predetermined angle, wherein the diffracted light detected by the first light detection unit is either undetected by the second light detection unit, or the second light detection unit receives an amount of the diffracted light detected by the first light detection unit that is less than a predetermined detection threshold, and wherein the particle detection unit determines whether detected light is scattered light from the particle or scattered light from the pattern based on output signals of the first light detection unit and output signals of the second light detection unit.

2. The particle inspection device according to claim 1, wherein the particle detection unit determines that an object is the particle only when each of the output signals of the first light detection unit and the second light detection unit is greater than or equal to the predetermined detection threshold.

3. The particle inspection device according to claim 2, wherein the particle detection unit determines that detected light is diffracted light from the pattern in a case where any of the output signals of the first light detection unit and the second light detection unit is less than the predetermined detection threshold.

4. The particle inspection device according to claim 1, wherein a polarizing plate is provided in front of each of the first light detection unit and the second light detection unit.

5. The particle inspection device according to claim 1, wherein each of the first light detection unit and the second light detection unit includes a plurality of light detectors paired with each other, and each of the plurality of light detectors paired with each other detects light from different positions in the laser beam that scans linearly and reciprocally.

6. A particle inspection method for inspecting a particle adhering to a substrate that comprises a reticle on which a pattern is formed, the particle inspection method comprising linearly and reciprocally scanning the substrate with a laser beam at a predetermined scanning direction, obliquely irradiating the substrate at a first predetermined angle with respect to a surface of the substrate, and detecting light reflected by the substrate by a first light detection unit and a second light detection unit to detect the particle based on output signals of the first light detection unit and the second light detection unit, wherein the first light detection unit and the second light detection unit are arranged obliquely at different elevation angles above the surface of the substrate, such that a light reception elevation angle with respect to the surface of the substrate and a light reception horizontal angle with respect to the predetermined scanning direction of the laser beam are different from each other, and such that an optical axis of the linearly and reciprocally scanning and of the obliquely irradiating, is different from each from among a first reception axis of the first light detection unit and a second reception axis of the second light detection unit, diffracted light from the pattern of which an angle with the predetermined scanning direction is a second predetermined angle is detected by the first light detection unit, and diffracted light from the pattern of which an angle with the predetermined scanning direction is other than the second predetermined angle is detected by the second light detection unit, wherein the diffracted light detected by the first light detection unit is either undetected by the second light detection unit, or the second light detection unit receives an amount of the diffracted light detected by the first light detection unit that is less than a predetermined detection threshold, and wherein the particle detection unit determines whether detected light is scattered light from the particle or scattered light from the pattern based on output signals of the first light detection unit and output signals of the second light detection unit.

* * * * *